G. LISPENARD & S. K. LICHTENSTEIN.
COTTON GIN.
APPLICATION FILED AUG. 21, 1912.
1,056,700.
Patented Mar. 18, 1913.
2 SHEETS—SHEET 2.
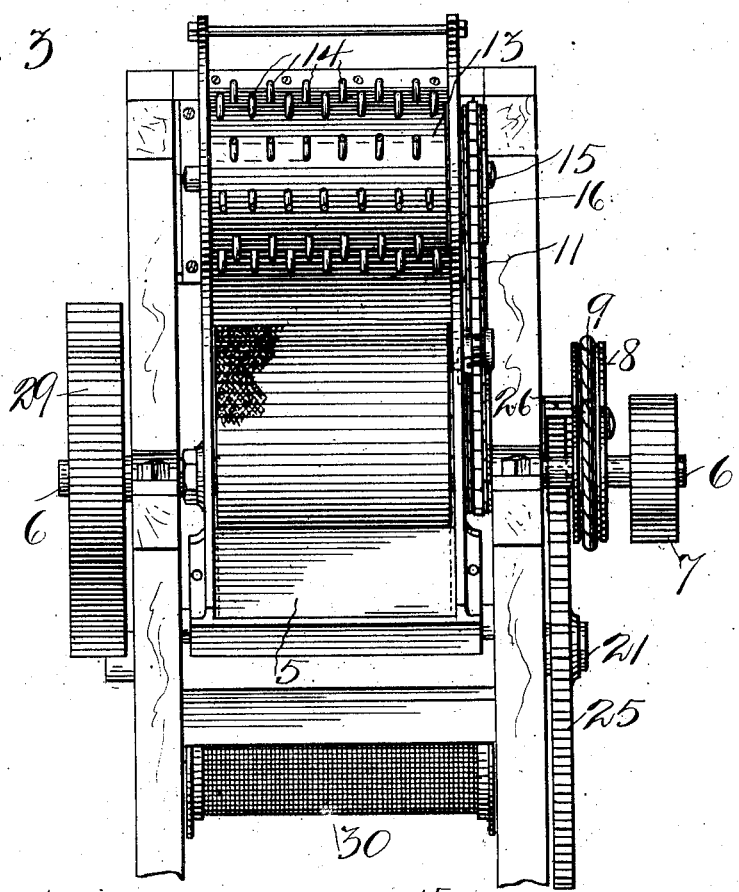
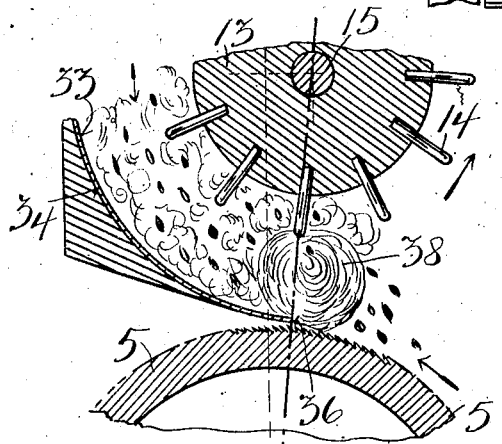

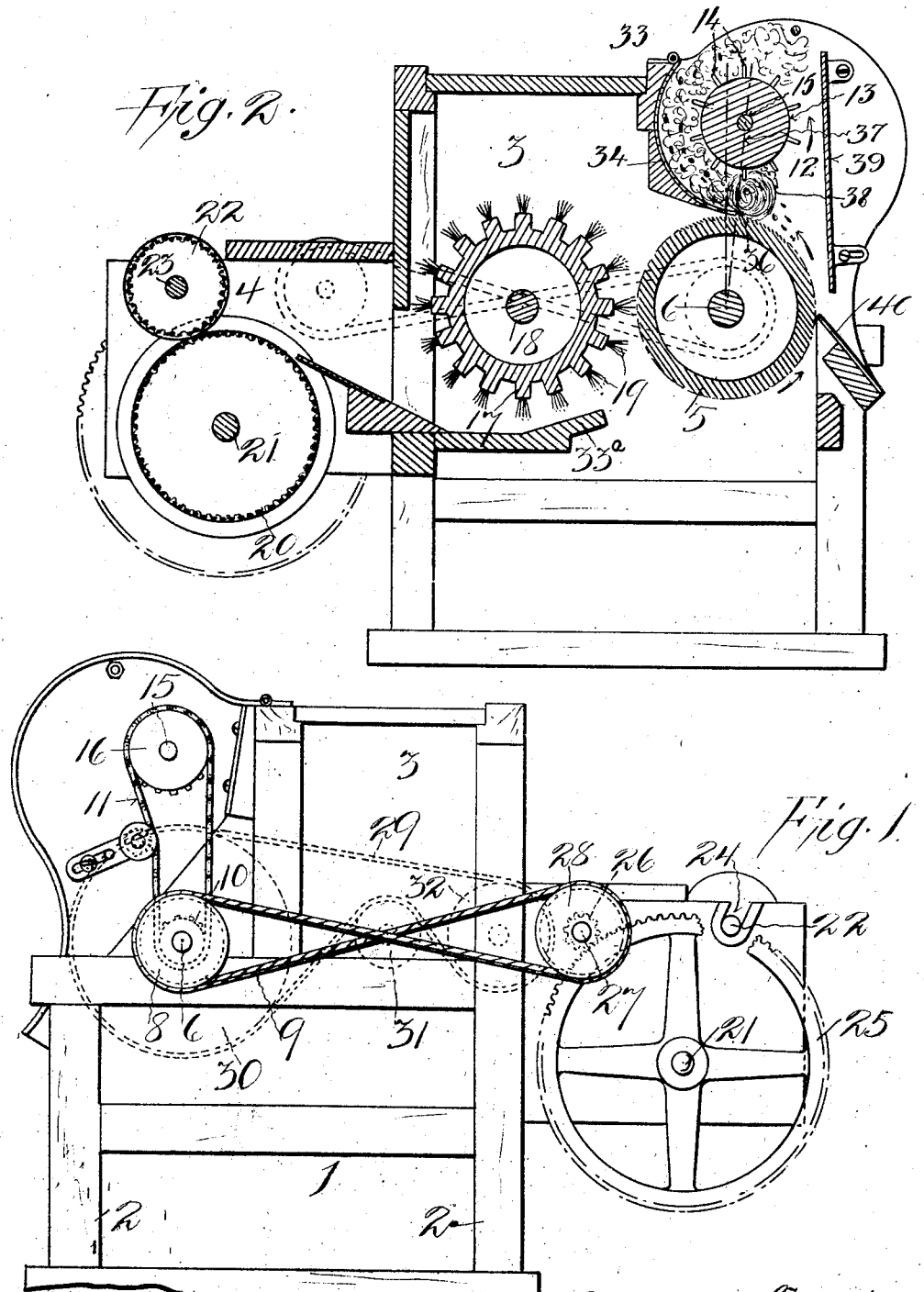

UNITED STATES PATENT OFFICE.

GEORGE LISPENARD AND SOLOMON K. LICHTENSTEIN, OF NEW YORK, N. Y., ASSIGNORS TO SOLOMON K. LICHTENSTEIN, TRUSTEE, OF NEW YORK, N. Y.

COTTON-GIN.

1,056,700.　　Specification of Letters Patent.　　Patented Mar. 18, 1913.

Continuation of application Serial No. 681,541, filed March 4, 1912. This application filed August 21, 1912. Serial No. 716,131.

*To all whom it may concern:*

Be it known that we, GEORGE LISPENARD and SOLOMON K. LICHTENSTEIN, citizens of the United States, residing, respectively, in the city of New York, borough of Brooklyn, county of Kings, and State of New York, and in the city, county, and State of New York, have invented certain new and useful Improvements in Cotton-Gins, of which the following is a specification.

The present case is a continuation of our application for patent, filed on the 4th day of March, 1912, and serially numbered 681,541, to which cross reference will be made herein.

The present invention relates to a cotton gin.

The object of the present invention is to provide efficient means for ginning the cotton and for moving the cotton seeds away from the point of ginning when the cotton fiber has been sufficiently removed therefrom.

Before the invention of the gin shown in our said copending application the most successful and, in fact, the only successful gin in use was the saw form of gin wherein a number of circular saws were mounted to move as a unit, a space being provided between the several saws sufficient to allow the seeds, when the fiber was removed therefrom, to drop away from the ginning point, and to pass downwardly between the saws. Ribs were provided between the saws on which the seeds fell and by which they were guided to a discharging point. In our said copending application we showed a cylinder form of gin wherein, instead of using a series of saws for removing the cotton fiber from the seeds a cylinder was employed wherein a spiral groove was formed around the periphery of the cylinder and slots of a particular shape cut the spiral thread to form a number of teeth of novel shape and arrangement. That cylinder has proven more successful in ginning cotton than the saw form of gin, because it removes the cotton from the seeds more rapidly and without shortening the staple. However, in that and other forms of cylinder gins it is impossible to discharge the cotton seeds from the point of ginning and away from the ginning cylinder in the same way that the seeds were discharged from the saw form of gin, because of the character of the cylinder and because the ribs could not be used as in the saw gin.

The object of the present invention is to provide means for properly feeding the cotton to the point of ginning and for delivering the seeds away from the point of ginning in a gin of the cylinder type. We accomplish the desired result by a novel arrangement of the ginning cylinder, the beater or agitator, and the opposing bar, as will be more fully explained hereinafter.

In the drawings forming a part of this application, Figure 1 is a side elevation of a cotton gin wherein our invention is employed. Fig. 2 is a longitudinal sectional view thereof, Fig. 3 is an end elevation thereof, with the seed board removed, and Fig. 4 is an enlarged sectional view of portions of the cylinder, beater and opposing bar.

In the drawings we have shown our invention embodied in a gin frame of ordinary construction. Herein the frame 1 consisting of standards 2, ginning box 3 and condenser box 4 support the various working parts of the gin.

The ginning cylinder 5 is mounted upon a shaft 6 extending crosswise of the ginning box 3 and journaled in the side walls thereof. The operating force for the several parts of the gin is preferably applied to a pulley 7 on the cylinder shaft and the operating force for various parts of the gin is directly or indirectly transmitted from the cylinder shaft. The cylinder shaft 6 is provided with a pulley 8 over which travels a belt 9; and with a sprocket 10 over which travels a chain 11. A beater 12 consisting of a cylindrical body 13 and radial spokes or agitators 14 along its length and around its periphery, is mounted upon a shaft 15, which also extends crosswise of the ginning box and is journaled in the side walls thereof; and this shaft is preferably parallel with the shaft 6 of the ginning cylinder. A sprocket 16 on the shaft 15 is driven from the cylinder shaft by the chain 11, which also travels over the sprocket 10. It will be observed that the ginning cylinder and the beater or agitator are revolved in same direction so that their adjacent faces move in opposite directions.

A revolving brush 17 is mounted on a shaft 18 and is arranged whereby its bristles 19 will wipe the face of the ginning cylinder, beyond the opposing bar, in order to remove the cotton from the cylinder as fast as the latter removes it from the cotton seeds.

In the condenser box beyond the brush, are arranged ordinary condenser rollers for condensing the ginned cotton. The larger roller 20 covered with wire gauze in the usual manner, is mounted upon a shaft 21 arranged crosswise of the condenser box; while the smaller, gauze covered roller 22 is mounted upon a shaft 23 parallel with the shaft 21. The smaller roller is loosely journaled in open journals 24 so that it will ride in contact with the larger roller or with the cotton passing between them. The larger condenser roller shaft 21 has a large gear 25 thereon which is driven by a smaller gear 26 mounted on the shaft 27. The latter shaft also has a pulley 28 which is operated by the crossed belt 9 which travels around the pulley 8 on the cylinder shaft.

The brush shaft 18 is operated by means of a belt 29 which travels over a large pulley 30 on the cylinder shaft, over a pulley 31 on the brush shaft and around an idler 32. A mote board 33ª is arranged below the brush and directs the cotton to the condenser roller in the usual manner. With the exception of the cylinder and the beater, the above parts are of the usual construction.

The ginning member 5 is of the cylinder or roller type as distinguished from the saw type; and preferably it is constructed in accordance with the ginning cylinder shown in our copending application above referred to. The beater or agitator it will be observed, is mounted parallel with the ginning cylinder and is revolved in the same direction.

An opposing bar is arranged in a novel relation to the cylinder and beater, in order to coöperate in securing the desired result. The opposing bar, which is here shown as a metallic plate 33 supported by a back wall 34, has a concave or recessed front surface directed toward the beater and preferably curved on an arc the center of which coincides with the axis of the beater. The opposing bar is arranged substantially to one side of a vertical line drawn through the axis of the ginning cylinder. Its curved front face is separated from the beater sufficiently to allow the latter to feed the cotton which is deposited in the upper part of the roll box 35 down to the point of ginning, between the opposing bar and beater. The front edge 36 of the opposing bar is straight, is preferably parallel with the periphery of the cylinder and is separated from it sufficiently to permit the teeth of the ginning cylinder to draw the cotton fiber past it, but not enough to permit the cotton seeds to pass between the opposing bar and the ginning cylinder. A fraction of an inch is all this space should be.

With the parts arranged as herein shown, it will be observed that if circles be drawn concentric respectively, with the axes of the ginning cylinder and with the beater, they will intersect at a point to the right of a line drawn vertically through the axis of the ginning cylinder. This is not imperative, but it is very desirable, as will be pointed out. Another way of describing this position is to say, that a straight line drawn through the axes of the ginning cylinder and of the beater will come to one side of the vertical line drawn through the axis of the ginning cylinder. In any event the edge 36 of the opposing bar comes to the vertical line drawn through the axis of the ginning cylinder in order that the cotton seed can not follow the ginning cylinder to that part of the periphery thereof which is moving downwardly. It avoids the formation of a pocket where the seeds might gather and escape the action of the beater or be ground to pieces against the edge of the opposing bar.

In the full embodiment of our invention the edge 36 of the opposing bar comes at least to the line drawn between the axes of the ginning cylinder and the beater. In order to illustrate this on the drawing a dotted line 37 has been drawn between the axes.

The beater is arranged sufficiently above the ginning cylinder so that, as the cotton is fed downwardly to the point or line of ginning, there will be sufficient space for the formation of a roll as indicated at 38 in the drawing. The tendency of the ginning cylinder is to move this roll up to the edge of the opposing bar; while the movement of the beater in a reverse direction has an opposite tendency. The result of this is to form the seed cotton into a roll and to revolve it at the point or line of ginning, i. e., at the front edge of the opposing bar.

When the ginning cylinder is revolved, its teeth, passing the opposing bar, will comb the cotton from the seeds and will carry it past the opposing bar; after which the cotton will be removed from the cylinder by the brush and will be delivered to the condensing rollers in the usual manner. The seeds can not pass between the cylinder and opposing bar, and in a cylinder form of gin they will contact with the outer periphery of the cylinder. The cotton and seeds forming the roll 38 will be continuously acted upon by the cylinder teeth and the seeds will finally be stripped of their cotton fiber. When the cotton has been combed from the seeds the latter will become more or less disentangled from the roll and they will be beaten outwardly from the roll by the action of the beater; and they will be thrown against the seed board 39 or downwardly upon the board 40.

By arranging the ginning cylinder, beater and opposing bar in the relation here shown we are able to properly and rapidly discharge the seeds after the cotton fiber has been removed therefrom. In the present arrangement there is no pocket formed where the seeds can lodge on the downwardly moving portion of the periphery of the cylinder, and wedge against the opposing bar and be ground to pieces by the cylinder; or escape the action of the beater. On the other hand the present arrangement prevents the beater from jamming the seeds against the cylinder and forcing them against the cylinder in such a manner as to cause the seeds to be cut to pieces. On the contrary, the beater forces the seeds away without injury as soon as the cotton has been removed therefrom and it also helps to revolve the roll of cotton.

Having described our invention, what we claim is:

1. In a cotton gin, the combination of a revoluble ginning cylinder, an opposing bar having a concave or recessed front surface and a substantially straight opposing edge, said bar being arranged substantially to that side of a vertical line drawn through the axis of the ginning cylinder which is above the descending portion of the cylinder, and having its opposing edge extending at least to the said vertical line, a revoluble beater above the cylinder and spaced therefrom sufficiently to form a substantial cotton roll, and coöperating with the opposing bar and cylinder, and means for revolving said cylinder and beater in the same direction.

2. In a cotton gin, the combination of a revoluble ginning cylinder, an opposing bar, a revoluble beater over the ginning cylinder and spaced therefrom sufficiently to form a substantial cotton roll, said opposing bar being arranged substantially to that side of a line drawn between the axes of the ginning cylinder and said beater which is over the descending portion of the cylinder, and having its opposing edge extending at least to said line, and means for revolving said cylinder and beater in the same direction.

3. In a cotton gin, the combination of a revoluble ginning cylinder, a revoluble beater arranged over the ginning cylinder, and separated sufficiently therefrom to form a substantial cotton roll between them, said beater having its axis to one side of a vertical line drawn through the axis of said cylinder, an opposing bar having a recessed front surface, arranged substantially to that side of said vertical line which is over the descending side of said cylinder and having its opposing edge extending to a line drawn between the axes of the ginning cylinder and beater, and means for revolving said cylinder and beater in the same direction.

4. In a cotton gin, the combination of a revoluble ginning cylinder, a revoluble beater having projections, said beater being arranged over the ginning cylinder and spaced therefrom sufficiently to form a substantial cotton roll between the cylinder and beater, an opposing bar having a concave front face, arranged substantially to one side of a vertical line passing through the axis of the ginning cylinder and having its opposing edge extending to a line passing through the axes of said cylinder and beater, and means for revolving said cylinder and beater in the same direction.

Signed at the city, county and State of New York, this 19th day of August, 1912.

GEORGE LISPENARD.
SOLOMON K. LICHTENSTEIN.

Witnesses:
 HENRY W. STOWELL,
 ARTHUR S. FRIEND.